United States Patent [19]

Lund

[11] Patent Number: 4,942,690
[45] Date of Patent: Jul. 24, 1990

[54] DOWNRIGGER RELEASE

[76] Inventor: Theodore A. Lund, 4859 Lougheed Highway, Burnaby, British Columbia, Canada, V5C 4A7

[21] Appl. No.: 329,590

[22] Filed: Mar. 28, 1989

[51] Int. Cl.$^5$ .............................................. A01K 91/06
[52] U.S. Cl. ................................................... 43/42.12
[58] Field of Search .................. 43/43.12, 43.13, 27.4; 24/306, 442; 128/DIG. 15

[56] References Cited

U.S. PATENT DOCUMENTS

| | | | |
|---|---|---|---|
| 2,830,400 | 4/1958 | Perry | 43/43.12 |
| 3,659,370 | 5/1972 | Ritter | 43/43.12 |
| 3,765,118 | 10/1973 | Reitler | 43/43.12 |
| 4,125,958 | 11/1978 | Cote | 43/43.12 |
| 4,177,599 | 12/1979 | Pettersen | 43/43.12 |
| 4,538,372 | 9/1985 | Petigoretz | 43/27.4 |
| 4,625,450 | 12/1986 | Roemer | 43/43.12 |
| 4,628,630 | 12/1986 | Bohme | 43/43.12 |

*Primary Examiner*—Kurt Rowan
*Attorney, Agent, or Firm*—Dellett, Smith-Hill and Bedell

[57] ABSTRACT

A downrigger release provides a first piece of flexible fastening material for releasable fastening to a downrigger line; a second piece of flexible fastening material for releasable fastening to the first piece of flexible fastening material; and, a connector for connecting the second piece of flexible fastening material to a fishing line.

10 Claims, 2 Drawing Sheets

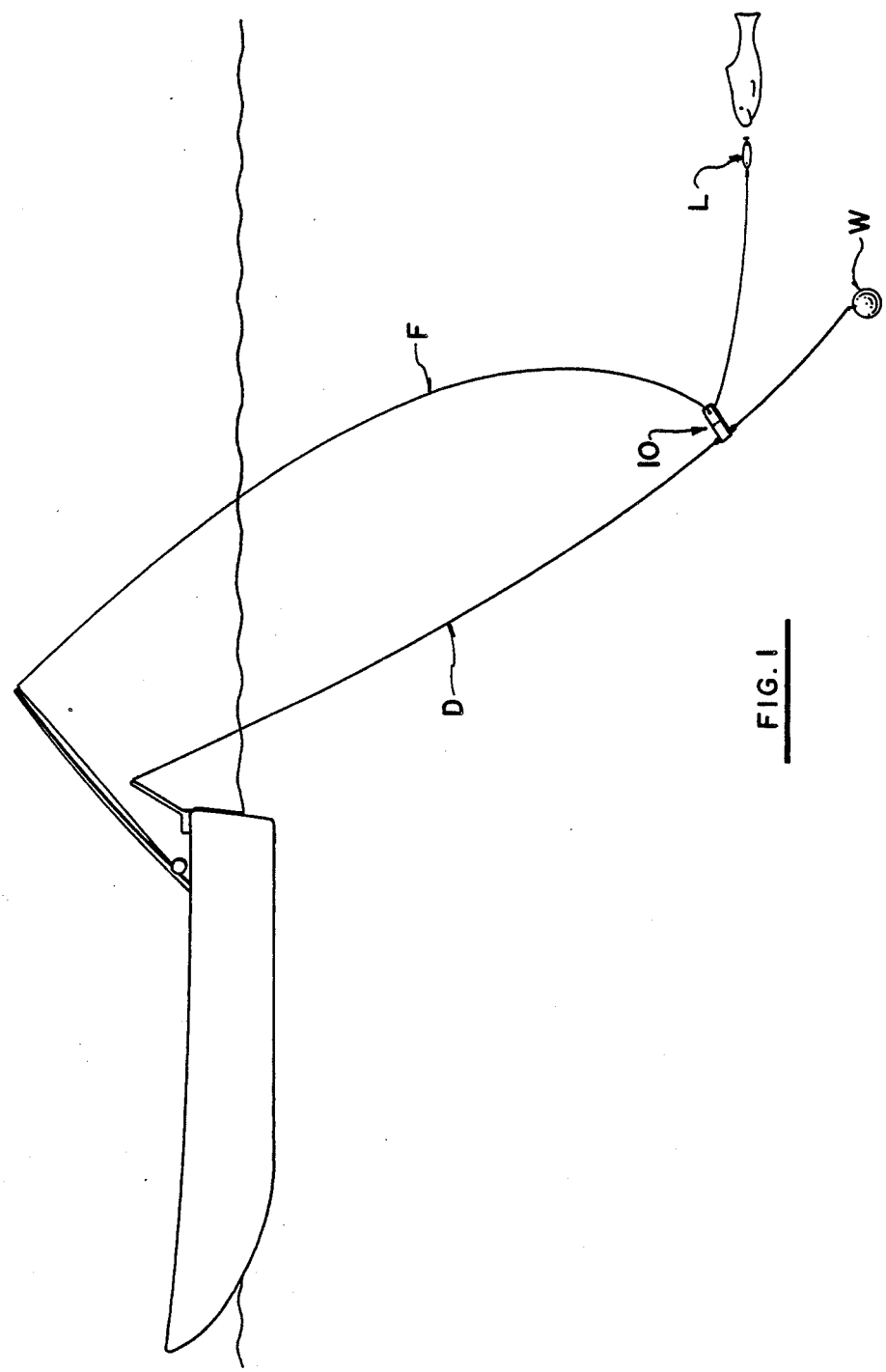

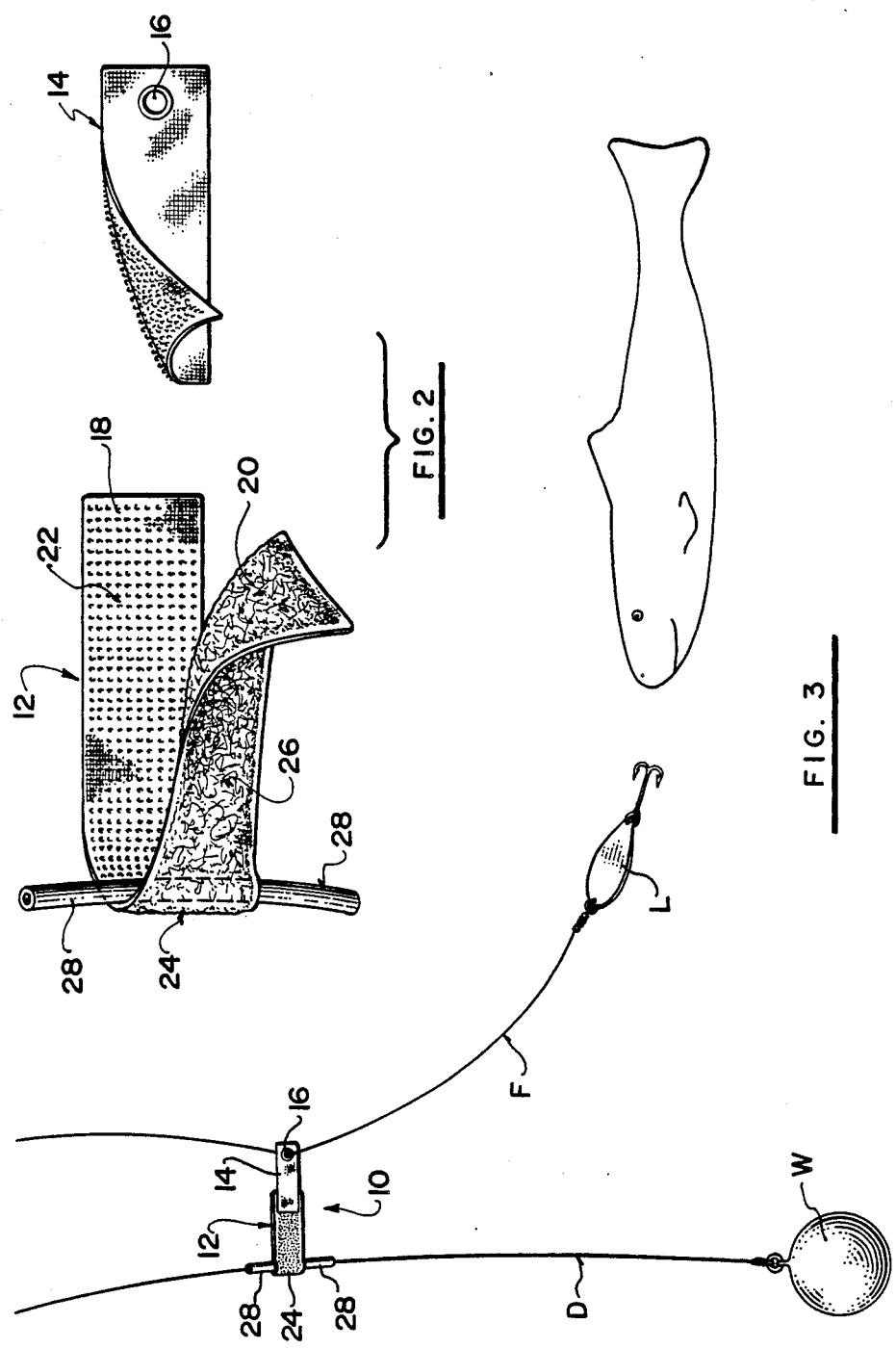

DOWNRIGGER RELEASE

FIELD OF THE INVENTION

This invention pertains to a downrigger release for releasably connecting a fishing line to a weighted downrigger line.

BACKGROUND OF THE INVENTION

In the sport of downrigger fishing, a steel "downrigger" line is carried to depths of fifty or more feet by a "cannon ball" weight of about ten pounds attached to the end of the downrigger line. A "downrigger release" releasably connects a separate fishing line to the downrigger line at a point near the ends of both lines. The weight therefore also carries the fishing line, together with any lures, bait or hooks attached thereto, to the depths aforesaid. If a fish is hooked, the downrigger release disconnects, freeing the fishing line from the downrigger line, so that the fish may be reeled to the surface in conventional fashion, leaving the downrigger line and weight in the water for separate retrieval.

Conventional downrigger releases incorporate a metal clothes pin-like clip which is releasably clipped to the downrigger line, a short distance above the weight. A tapered plastic or Nylon TM socket is attached to the clip. One end of a mating, tapered plastic or Nylon plug is releasably insertable into the socket. The opposite end of the plug is attached to the fishing line. If a fish is hooked, its struggles pull the plug out of the socket, thereby freeing the fishing line from the downrigger line so that the fish may be reeled to the surface in conventional fashion.

The downrigger release aforesaid suffers a number of disadvantages. For example, it is difficult to adjust the force with which the plug is inserted into the socket, particularly after repeated mating of the plug and socket. If the plug is inserted too tightly into the socket, then a hooked fish may not be able to pull the plug out of the socket, making it extremely difficult to land the fish, since the weighted downrigger line will then have to be retrieved together with the fishing line and the fish. If the plug is inserted too loosely into the socket, then the plug may pull free of the socket in the absence of a fish, necessitating time consuming retrieval of both lines, reinsertion of the plug into the socket, and redeployment of the lines into the water.

The conventional plug and socket downrigger release is also subject to breakage if the plastic parts are stepped upon, as can easily happen during normal fishing conditions. The metal clip and plug/socket combination is relatively bulky and causes considerable drag on the underwater lines.

The present invention overcomes the foregoing disadvantages.

SUMMARY OF THE INVENTION

The invention provides a downrigger release comprising a first piece of flexible fastening material for releasable fastening to a downrigger line; a second piece of flexible fastening material for releasable fastening to the first piece of flexible fastening material; and, a connector means for connecting the second piece of flexible fastening material to a fishing line.

The first piece of flexible fastening material preferably comprises an inner surface having a first portion comprising Velcro TM loop type fastening material and a second portion comprising Velcro TM hook type fastening material, the loop type fastening material being releasably fastenable to the hook type fastening material. Advantageously, a hinge means is provided for connecting the first portion to the second portion.

The first piece of flexible fastening material may have an outer surface comprising loop type fastening material, in which case the second piece of flexible fastening material preferably comprises hook type fastening material. Alternatively, the first piece of flexible fastening material may have an outer surface comprising hook type fastening material, in which case the second piece of flexible fastening material preferably comprises loop type fastening material. In either case, the second piece of flexible fastening material is releasably fastenable to the first piece of flexible fastening material by overlapping selected regions of the first and second pieces of flexible fastening material.

Advantageously, stop means are provided for stopping movement of the first piece of flexible fastening material relative to the downrigger line while the first piece of flexible fastening material is releasably fastened to the downrigger line. The stop means may advantageously comprise a small diameter, flexible tube which may be threaded over the downrigger line. Friction between the tube and the first piece of flexible fastening material, while the first piece of flexible fastening material is releasably fastened to the downrigger line, holds the downrigger release in place relative to the downrigger line.

BRIEF DESCRIPTION OF THE DRAWINGS

FIG. 1 depicts the downrigger fishing operation in which a downrigger release constructed in accordance with the preferred embodiment of the invention releasably connects a fishing line to a downrigger line.

FIG. 2 depicts a downrigger release constructed in accordance with the preferred embodiment of the invention.

FIG. 3 shows the downrigger release of FIG. 2 releasably connecting a fishing line to a downrigger line.

DETAILED DESCRIPTION OF THE PREFERRED EMBODIMENT

As depicted in the drawings, downrigger release 10 comprises a first piece of flexible fastening material 12 for releasable fastening to downrigger line "D"; a second piece of flexible fastening material 14 for releasable fastening to first piece 12; and, a "connector means", namely eyelet 16, for connecting second piece 14 to fishing line "F". Lures, bait and/or hooks "L" are attached to the end of fishing line "F". Cannon ball weight "W" attached to the end of downrigger line "D" carries lines "D" and "F" to the desired fishing depth.

First piece of flexible fastening material 12 has an inner surface 18 comprised of two separate portions 20, 22. First portion 20 comprises Velcro TM loop type fastening material. Second portion 22 comprises Velcro TM hook type fastening material. The loop type fastening material comprising first portion 20 is releasably fastenable to the hook type fastening material comprising second portion 22. First and second portions 20, 22 are connected to one another by a "hinge means", namely flexible band 24.

The outer surface 26 of first piece of flexible fastening material 12 may comprise either Velcro TM loop type fastening material; or, Velcro TM hook type fastening material. In the former case, at least a portion of second piece of flexible fastening material 14 comprises Velcro TM hook type fastening material. In the latter case, at least a portion of second piece of flexible fastening material 14 comprises Velcro TM loop type fastening material.

A "stop means", namely small diameter, flexible rubber tube 28 is provided for stopping movement of first piece of flexible fastening material 12 relative to downrigger line "D", while first piece 12 is releasably fastened to downrigger line "D".

In operation, tube 28 is threaded over downrigger line "D" and moved to the point on downrigger line "D" at which downrigger release 10 is to be attached. First and second portions 20, 22 of first piece of flexible fastening material 12 are peeled apart from one another and then wrapped around tube 28 such that tube 28 is fitted within flexible band 24. Portions 20, 22 are then pressed together, thereby releasably fastening first piece 12 to downrigger line "D". Fishing line "F" is passed through eyelet 16 of second piece of flexible fastening material 14. Second piece 14 is then twisted several times to hold it in place on fishing line "F". Second piece 14 is then releasably fastened to first piece 12 by overlapping a selected region of the Velcro TM fastening material of second piece 14 with a corresponding region of the mating Velcro TM fastening material comprising the outer surface 26 of first piece 12, and pressing the two regions together. Drag forces imparted to fishing line "F" by lure "L" cause friction between tube 28 and first piece 12, thereby holding first piece 12 in place on downrigger line "D". If a fish is hooked, its struggles pull on fishing line "F", which in turn pulls on second piece 14, peeling it away from first piece 12 and thus disconnecting fishing line "F" from downrigger line "D" so that the fish may be reeled in.

Downrigger release 10 facilitates much better control over the force required to disconnect fishing line "F" from downrigger line "D" than prior art downrigger releases, through selection of the size of the overlapping regions over which first and second pieces 12, 14 are pressed together. The greater the size of the overlapping regions, the greater the force required to peel pieces 12, 14 apart to disconnect fishing line "F" from downrigger line "D". The flexible fastening material from which downrigger release 10 is made is also much more resistant to breakage than the prior art plastic or Nylon TM devices described above. Accordingly, first piece 12 may be left in place on downrigger line "D" when not in use, thus saving setup time. It is usually necessary to remove prior art downrigger releases from the downrigger line when not in use in order to avoid breakage. Downrigger release 10 is also compact and light weight, so it causes little underwater drag in comparison to prior art devices of the sort described above. Downrigger release 10 may also be shaped and/or coloured to resemble a fishing lure, rendering it more attractive to fish than prior art downrigger releases.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A downrigger release, comprising:
   (a) a first piece of flexible fastening material for releasable fastening to a downrigger line;
   (b) a second piece of flexible fastening material for releasable fastening to said first piece of flexible fastening material; and,
   (c) connector means for connecting said second piece of flexible fastening material to a fishing line:
   wherein said first piece of flexible fastening material comprises an inner surface having a first portion comprising loop type fastening material and a second portion comprising hook type fastening material, said loop type fastening material being releasably fastenable to said hook type fastening material.

2. A downrigger release as defined in claim 1, further comprising hinge means for connecting said first portion to said second portion.

3. A downrigger release as defined in claim 1, wherein said first piece of flexible fastening material further comprises an outer surface comprising loop type fastening material.

4. A downrigger release as defined in claim 3, wherein said second piece of flexible fastening material comprises hook type fastening material.

5. A downrigger release as defined in claim 1, wherein said first piece of flexible fastening material further comprises an outer surface comprising hook type fastening material.

6. A downrigger release as defined in claim 5, wherein said second piece of flexible fastening material comprises loop type fastening material.

7. A downrigger release as defined in claim 4, wherein said second piece of flexible fastening material is releasably fastenable to said first piece of flexible fastening material by overlapping selected regions of said first and second pieces of flexible fastening material.

8. A downrigger release as defined in claim 6, wherein said second piece of flexible fastening material is releasably fastenable to said first piece of flexible fastening material by overlapping selected regions of said first and second pieces of flexible fastening material.

9. A downrigger release as defined in claim 2, further comprising stop means for stopping movement of said first piece of flexible fastening material relative to said downrigger line while said first piece of flexible fastening material is releasably fastened to said downrigger line.

10. A downrigger release as defined in claim 9, wherein said stop means comprises a small diameter, flexible tube threadable over said downrigger line and fictionally engageable with said first piece of flexible fastening material while said first piece of flexible fastening material is releasably fastened to said downrigger line.

* * * * *